(12) United States Patent
Deng et al.

(10) Patent No.: US 6,576,328 B2
(45) Date of Patent: Jun. 10, 2003

(54) MAGNETIC THIN FILM MEDIA WITH A PROTECTIVE LAYER OF CNX HAVING A PLURALITY OF COMPOSITIONS

(75) Inventors: Hong Deng, San Jose, CA (US); George William Tyndall, III, San Jose, CA (US); Richard Longstreth White, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 45 days.

(21) Appl. No.: 09/944,787

(22) Filed: Aug. 30, 2001

(65) Prior Publication Data

US 2003/0044650 A1 Mar. 6, 2003

(51) Int. Cl.$^7$ .................................................. G11B 5/72
(52) U.S. Cl. ...................... 428/212; 428/216; 428/408; 428/694 TC; 428/704; 428/336; 427/131
(58) Field of Search ........................ 428/212, 216, 428/408, 694 TC, 704, 336; 427/131

(56) References Cited

U.S. PATENT DOCUMENTS

| | | | |
|---|---|---|---|
| 4,664,976 A | * 5/1987 | Kimura et al. | ............. 428/336 |
| 5,364,690 A | 11/1994 | Takahashi et al. | |
| 5,368,937 A | 11/1994 | Itoh | |
| 5,679,431 A | 10/1997 | Chen et al. | |
| 5,837,357 A | 11/1998 | Matsuo et al. | |
| 5,942,317 A | 8/1999 | White | |
| 5,945,191 A | * 8/1999 | Hwang et al. | ............. 428/65.5 |
| 6,136,403 A | * 10/2000 | Prabhakara et al. | ....... 428/65.3 |
| 6,238,780 B1 | * 5/2001 | Wu et al. | ................... 428/213 |

* cited by examiner

Primary Examiner—Stevan A. Resan
(74) Attorney, Agent, or Firm—G. Marlin Knight

(57) ABSTRACT

A thin film structure comprising a protective layer structure having at least two different compositions of carbon and nitrogen with the surface of the protective layer having the lowest nitrogen content is disclosed. The protective layer structure of the invention is preferably used over the magnetic material in a thin film magnetic disk. In the protective layer structure of the invention, the durability of a relatively high nitrogen content CNx material is improved by the addition of a surface sublayer of CNx with a relatively low nitrogen concentration. The resulting protective layer structure provides superior durability to either of the thin film compositions used alone achieving a synergistic result. The protective layer structure of the invention has the additional benefit of decreasing the polar surface energy and therefore, improving the corrosion resistance of the film structure. In one embodiment the protective layer of the invention is implemented as two discrete sublayers with the surface sublayer having the lowest nitrogen concentration. In this embodiment the surface sublayer has from 0 to 8 at. % nitrogen and the higher nitrogen content is between 10 and 25 at. % nitrogen at the magnetic layer interface. The protective layer structure of the invention can also be implemented as a film in which the nitrogen content gradually decreases between the magnetic layer and the surface of the protective layer structure.

20 Claims, 4 Drawing Sheets

МАGNETIC THIN FILM MEDIA WITH A PROTECTIVE LAYER OF CNX HAVING A PLURALITY OF COMPOSITIONS

FIELD OF THE INVENTION

The invention relates to magnetic thin film media and methods for their fabrication and more particularly to magnetic thin film disks having a protective layer structure composed of carbon and nitrogen (CNx) and wherein the of the protective layer has more one composition of CNx.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The protective layer structure (not shown) is typically the last or uppermost layer.

The conventional disk 16 typically has a substrate 26 of AlMg or glass. The thin films 21 on the disk 16 typically include a chromium or chromium alloy underlayer that is deposited on the substrate 26. The magnetic layer in the thin films 21 is based on various alloys of cobalt, nickel and iron. For example, a commonly used alloy is CoPtCr. However, additional elements such as tantalum and boron are often used in the magnetic alloy.

The protective overcoat layer 35 is used to improve wearability and corrosion. The materials and/or compositions which are optimized for one performance characteristic are rarely optimized for others. The most commonly used protective layer materials for commercial thin film disks have been carbon, hydrogenated carbon (CHx), nitrogenated carbon (CNx) and CNxHy. Efforts to optimize overcoat properties have included use of a layer structure using different materials and/or compositions for each of two or more layers in the overcoat structure. For example, U.S. Pat. No. 5,942,317 issued to R. White describes the use of a graded CHx protective layer wherein the hydrogen content is highest at the film's surface to take advantage of the lower polar surface energy characteristic of higher hydrogen levels (which improves corrosion resistance) and is lowest at the interface with the magnetic layer to optimize the adhesion properties. The midlevel of the CHx film is likewise optimized by having an intermediate hydrogen concentration which has a high hardness to improve wearability. The variations in the hydrogen can be continuous or discrete. For example, a protective layer structure with three sublayers with low hydrogen concentration nearest the magnetic layer, intermediate hydrogen concentration in the middle sublayer and high hydrogen concentration at the surface is suggested by White '317.

In U.S. Pat. No. 5,679,431 Chen, et al., describe the use of a bilayer protective overcoat in which the initial sublayer is carbon, titanium or chromium and the surface sublayer is CHx or CNx. The problem being addressed in Chen '431 is diffusion of nitrogen or hydrogen into the magnetic layer. The initial sublayer is intended to act as a diffusion barrier.

SUMMARY OF THE INVENTION

The applicants disclose a thin film structure comprising a protective layer structure having at least two different compositions of carbon and nitrogen with the surface of the protective layer having the lowest nitrogen content. The protective layer structure of the invention is preferably used over the magnetic layer on a thin film magnetic disk. The applicants have discovered that the durability of a relatively high nitrogen content CNx protective layer structure is improved by the addition of a surface sublayer of CNx with a relatively low nitrogen concentration. The resulting protective layer structure provides superior durability to either of the thin film compositions used alone; thus, a synergistic result is achieved. The protective layer structure of the invention has the additional benefit of decreasing the polar surface energy and therefore, improving the corrosion resistance of the film structure. In one embodiment the protective layer of the invention is implemented as two discrete sublayers with the surface sublayer having the lowest nitrogen concentration. In this embodiment the surface sublayer has from 0 to 8 at. % nitrogen and the higher nitrogen content is between 10 and 25 at. % nitrogen at the magnetic layer interface. The protective layer structure of the invention can also be implemented as a film in which the nitrogen content gradually decreases between the magnetic layer and the surface of the protective layer structure.

DETAILED DESCRIPTION OF THE INVENTION AND THE PREFERRED EMBODIMENTS

Figure 1:
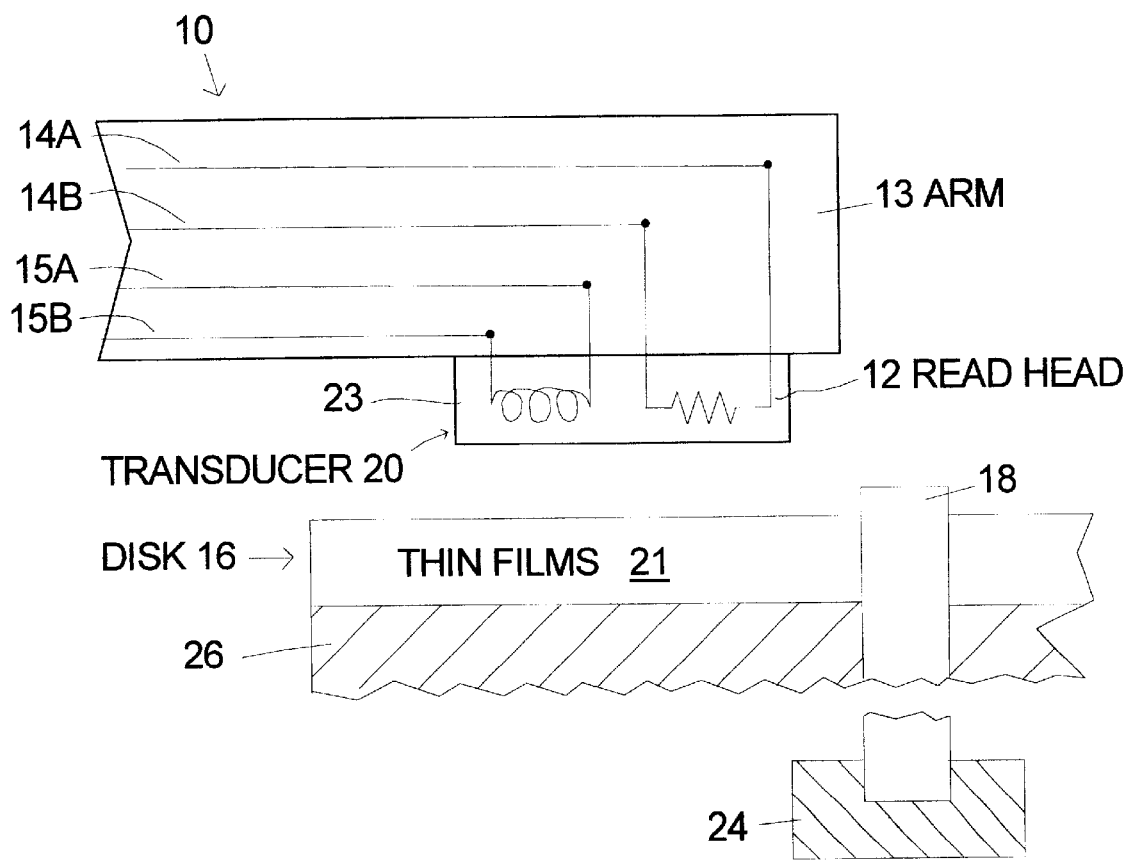
FIG. 1 is a symbolic illustration of the prior art showing the relationships between the head and associated components in a disk drive.
Figure 2:
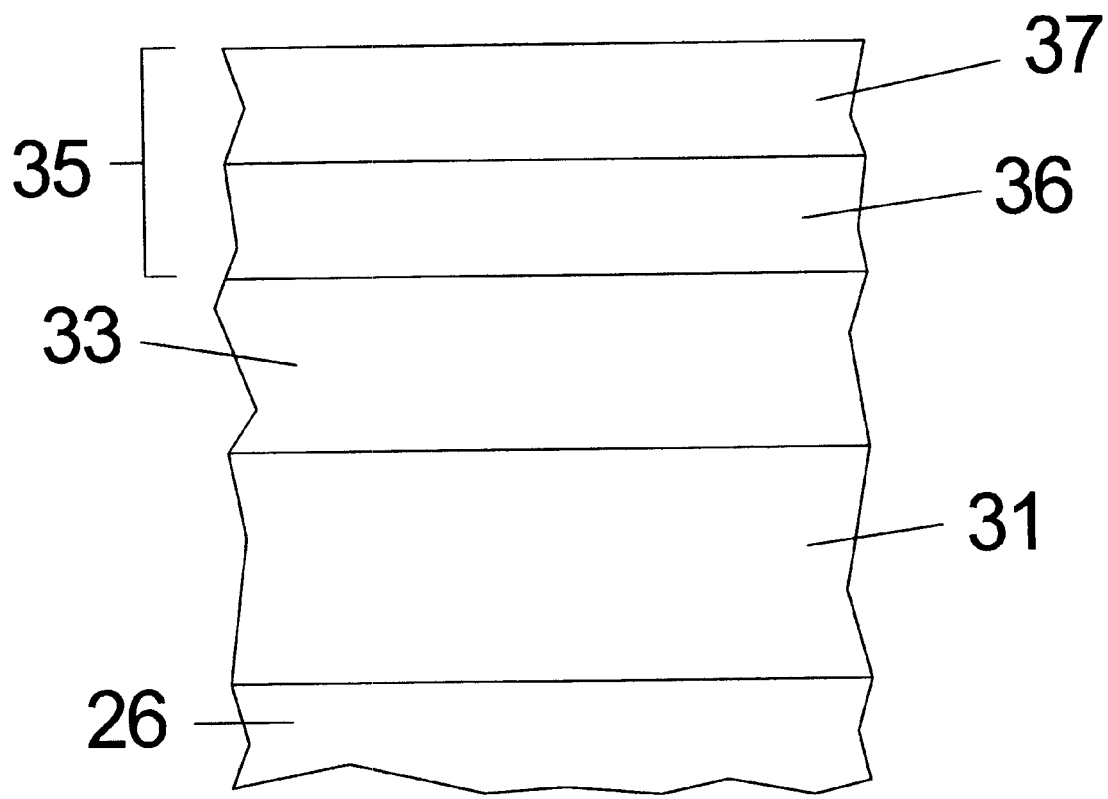
FIG. 2 is an illustration of a layer structure for a magnetic thin film disk according to the invention.

FIG. 2 illustrates a cross section of a magnetic thin film disk embodying the protective layer structure of the invention. The film structure illustrated is simple in that it contains only one magnetic layer 33 and one underlayer 31. The protective layer structure of the invention is not dependent on any particular magnetic layer structure and therefore, may be used on any combination of multiple magnetic layers, underlayers and seed layers. The terminology which will be used herein to refer to the one or more sublayers collectively as the protective layer structure 35. In the embodiment shown in FIG. 2, two sublayers 36, 37 are used to implement the protective layer structure 35. The outermost or surface of the thin film structure is the low nitrogen content sublayer 37. The high nitrogen sublayer 36 is in contact with the magnetic layer 33. In practice a lubricant (not shown) will typically be applied on the surface of the disk, i.e., on the low nitrogen sublayer 37. The benefits of the protective layer structure of the invention are not believed to be dependent on the presence or absence of the lubricant or the precise composition of the lubricant.

The preferred method of depositing the high and low nitrogen content sublayers is sputtering using known techniques for forming a CNx film. A graphite target is used and nitrogen is introduced into the chamber as a gas. The relative concentration of nitrogen in the deposited film is controlled by modulating the partial pressure of the nitrogen gas in the chamber. Lower partial pressures of nitrogen result in lower concentrations of nitrogen in the film as would be expected. As is well known to those in the sputtering arts, the precise partial pressures of nitrogen and the working gas (typically argon) are derived empirically for each unique combination of equipment used in the sputtering process.

Figure 3:
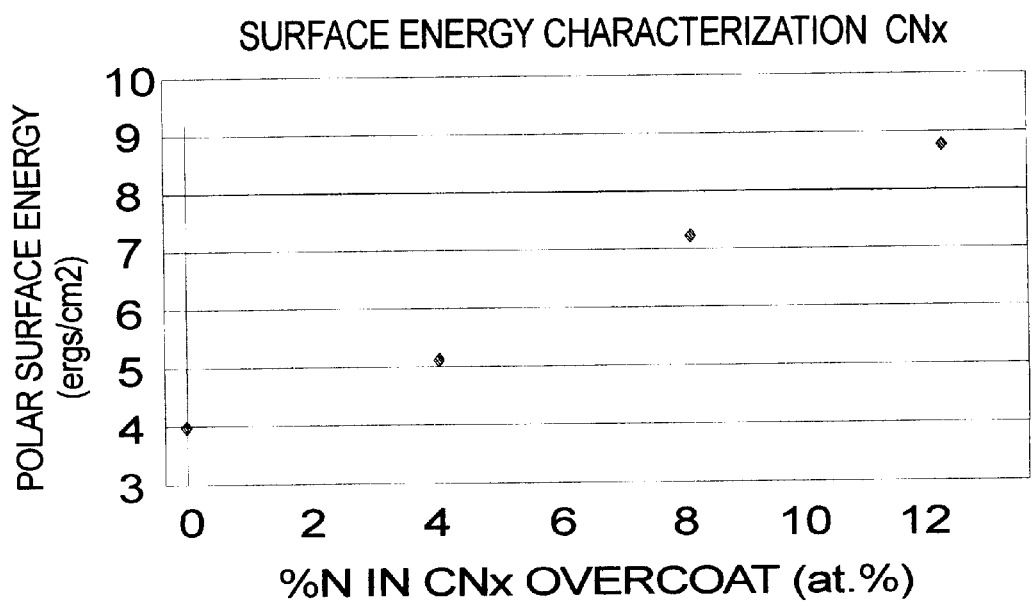
FIG. 3 is a graph of polar surface energy versus nitrogen content in a CNx overcoat.

As noted above controlling the polar surface energy of a thin film magnetic disk is important in order to reduce corrosion of the magnetic layer to acceptable levels. The relationship between polar surface energy and corrosion is due to the fact that high polar surface energy implies that the film is more hydrophillic. Water condensation is known to increase corrosion of the films on a magnetic disk and under humid conditions may also increase the corrosion of the active elements in the magnetic transducer. In commercial disk drives, a per-flouropolyether lubricant is typically applied over the protective layer on the disk. Therefore, the data presented below was obtained by measuring the polar surface energy of the films with the lubricant applied in order to more closely simulate real world conditions. FIG. 3 is a graph of polar surface energy derived from the water contact angle for four films with varying nitrogen content. The data clearly show a monotonically increasing polar surface energy with increasing nitrogen content in the film from zero to 12 at. %. The absolute magnitude of polar surface energy was subject to variation according to the precise measurement context, but the trend was consistent. The conclusion is that higher nitrogen content at the surface of the protective layer will have a deleterious effect on corrosion performance. Therefore, applicants' preferred embodiment of the invention has less than 8 at. % nitrogen in the surface sublayer.

Figure 4:
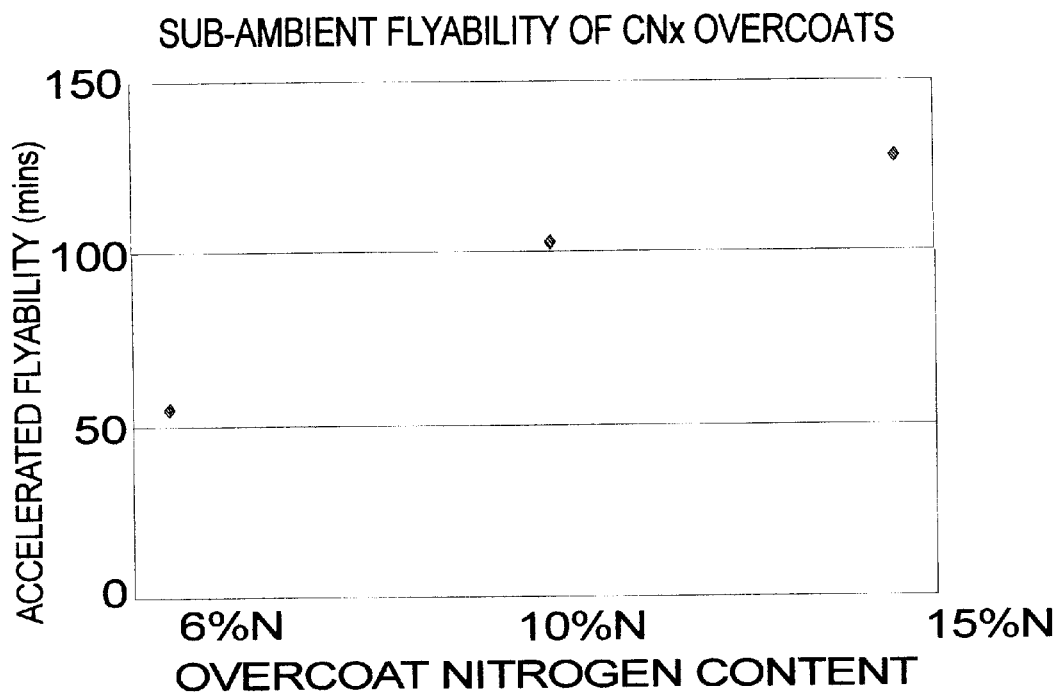
FIG. 4 is a graph of the accelerated flyability test results for a disk with a CNx overcoat.

FIG. 4 is a graph of results of accelerated flyability testing which is used to gauge the durability of the disk when used in a disk drive. The accelerated flyability test produces intermittent high speed contact between the slider surface of the magnetic transducer and the disk overcoat. The accelerated flyability test stresses the slider/disk interface beyond what is normal in disk drive operation and, therefore, accelerates failures to occur in minutes which might otherwise take years of typical disk drive operation to manifest themselves. The data are from three disks with different levels of nitrogen in the protective layer varying from 6 at. % to 15 at. %. In contrast to corrosion, the durability of the disks was significantly improved as the nitrogen content increased. The 6 at. % N CNx film resulted in a test result of approximately 50 minutes of flyability while the 10 at. % N $CN_x$ film resulted in 100 minutes of flyability. The 13 at. % N $CN_x$ film further increased the result to approximately 125 minutes.

Figure 5:
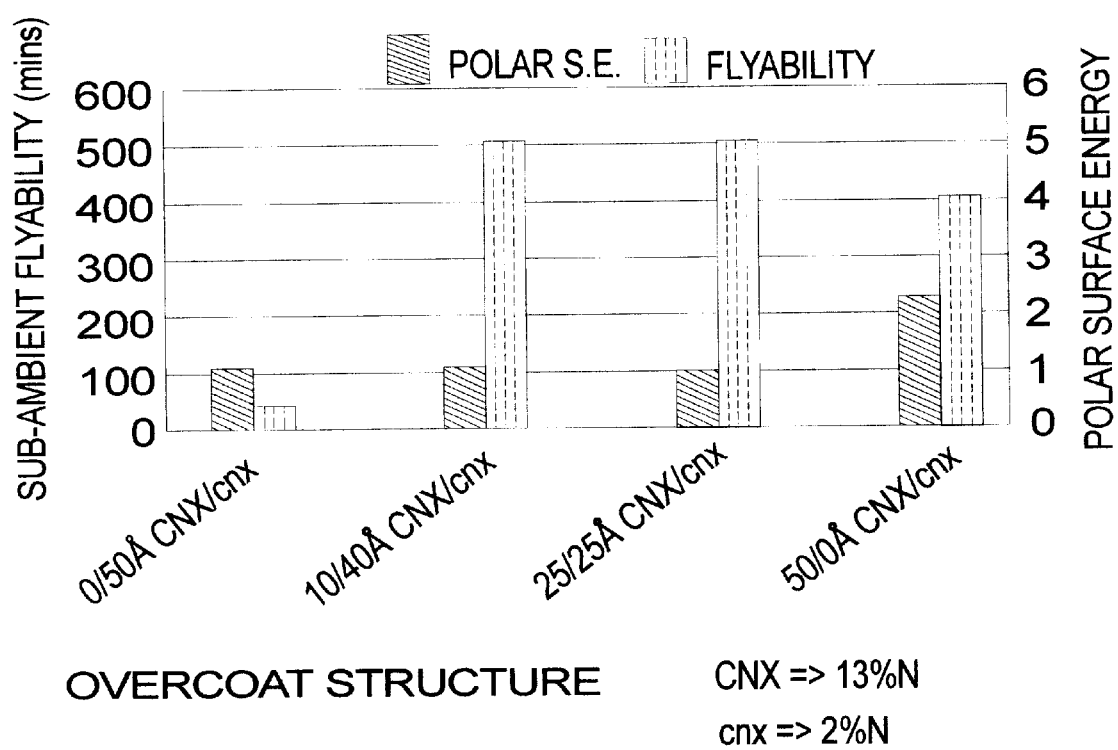
FIG. 5 is a graph of the sub-ambient flyability test results and polar surface energy for four disks with differing CNx overcoat structures.

FIG. 5 is a graph which presents both sub-ambient pressure flyability test results and polar surface energy for four test disks. The data points are shown in bar graph form. The leftmost pair of bars are for a disk (disk-1) with a 5 nm thick film of 2 at. % N $CN_x$. This disk had the lowest flyability result at approximately 50 minutes. The rightmost pair of bars are for a disk (disk-4) with a protective layer of 13 at. % N $CN_x$, which was also 5 nm thick. As the previous data of FIGS. 3 and 4 would predict the higher nitrogen content (13 at. %) was associated with a substantial increase in durability as indicated by the approximately 400 minutes survival in the flyability test. Also as expected, the higher nitrogen content resulted in the undesirable increase in the polar surface energy.

The remaining data of FIG. 5 reflect an unexpected result obtained from protective layers with heterogenous sublayers. The second disk from the left (disk-2) was prepared with a protective layer structure consisting of an initial sublayer of 1 nm of 13 at. % N $CN_x$ followed by a surface sublayer of 6 at. % N $CN_x$ which was 4 nm thick (1:4). The "1:4" protective layer resulted in over 500 minutes of flyability which was approximately 20% higher than disk-4 that had a homogeneous 5 nm 13 at. % N $CN_x$ film. In comparison to disk-1 that had a 5 nm 2 at. % N $CN_x$ film, the addition of a sublayer of 1 nm of 13 at. % N $CN_x$ resulted in a 10× increase in durability, i.e., from about 50 minutes to 500 minutes. Disk-3 had a protective layer structure of 2.5 nm 13 at. % N $CN_x$ followed by 2.5 nm of 2 at. % N $CN_x$. Disk-3 yielded test results essentially identical to those of disk-2. Despite the significant increase in durability, the heterogeneous structures of disks 2 and 3 had polar surface energy values essentially equal to disk-1. Thus, the heterogeneous protective layer structures of disks 2 and 3 were superior to either homogeneous film of disks 1 or 4 by having improved durability without deleterious increases in polar surface energy. Moreover, the heterogeneous structures have a synergy that results in durability which is greater than either sublayer composition used alone.

The preferred embodiment of the invention has from 10 to 25 at. % nitrogen in the sublayer nearest the magnetic layer. The preferred thickness of the low nitrogen surface layer is from 0.5 to 8 nanometers. The preferred thickness of the high nitrogen layer is from 1 to 8 nanometers. An alternative embodiment could have a graded nitrogen concentration which begins in the high range (10 to 25 at. %) and gradually decreases to the low range (0 to 8 at. %). This could be accomplished by gradually reducing the partial pressure of nitrogen while the film is being deposited.

The atomic percent compositions given above are given without regard for the small amounts of contamination that invariably exist in sputtered thin films as is well known to those skilled in the art.

The invention has been described with respect to use on thin film magnetic disks, but other uses and applications which can benefit from the properties of the protective layer structure of the invention will be apparent to those skilled in the art.

What is claimed is:

1. A thin film layer structure comprising:
    a magnetic layer; and
    a protective layer above the magnetic layer having at least two distinct compositions of carbon and nitrogen with a highest atomic percentage of nitrogen occurring nearest the magnetic layer.

2. The thin film layer structure of claim 1 wherein the highest atomic percentage of nitrogen is from 10 to 25 atomic percent.

3. The thin film layer structure of claim 2 wherein a lowest atomic percentage of nitrogen is from 0 to 8 atomic percent.

4. The thin film layer structure of claim 3 wherein the two distinct compositions are in first and second sublayers with the second sublayer having the lowest atomic percentage of nitrogen and being from 0.5 to 8 nanometers thick.

5. The thin film layer structure of claim 2 wherein the two distinct compositions are in first and second sublayers with the first sublayer having the highest atomic percentage of nitrogen and being from 1 to 8 nanometers thick.

6. The thin film layer structure of claim 1 wherein a lowest atomic percentage of nitrogen is from 0 to 8 atomic percent.

7. The thin film layer structure of claim 6 wherein the highest atomic percentage of nitrogen is from 10 to 25 atomic percent nitrogen.

8. The thin film layer structure of claim 7 herein the two distinct compositions are in first and second sublayers and the first sublayer is from 1 to 8 nanometers thick and the second sublayer is from 0.5 to 8 nanometers thick.

9. A method of fabricating a magnetic thin film storage media comprising the steps of:

depositing a thin film magnetic layer;

depositing a first layer of carbon and nitrogen with a first atomic percent of nitrogen; and depositing a second layer of carbon and nitrogen with a second atomic percent of nitrogen with the second atomic percentage of nitrogen being lower than the first atomic percentage of nitrogen and the second protective layer being a surface layer on the thin film storage media.

10. The method of claim 9 Wherein the first atomic percentage of nitrogen is from 10 to 25 atomic percent.

11. The method of claim 9 wherein the second atomic percentage of nitrogen is from 0 to 8 atomic percent.

12. The method of claim 11 wherein the first layer has from 10 to 25 atomic percent nitrogen.

13. The method of claim 12 wherein the second layer is from 0.5 to 8 nanometers thick.

14. The method of claim 9 wherein the first layer is from 1 to 8 nanometers thick.

15. The method of claim 9 wherein the second layer is from 0.5 to 8 nanometers thick.

16. The method of claim 15 wherein the second layer has from 0 to 8 atomic percent nitrogen.

17. A disk drive comprising:

a magnetic transducer including a read and a write head for reading and writing magnetic transitions;

a spindle; and a thin film disk mounted on the spindle to rotate in a confronting position in relation to the magnetic transducer, the thin film disk including magnetic material in which the magnetic transducer writes magnetic transitions; and a protective layer over the magnetic material having at least two distinct compositions of carbon and nitrogen with a highest atomic percentage of nitrogen occurring nearer the magnetic material.

18. The disk drive of claim 17 wherein the two distinct compositions of carbon and nitrogen occur in first and second sublayers with the second sublayer being at a surface of the thin film disk and having from 0 to 8 atomic percent nitrogen.

19. The disk drive of claim 17 wherein the two distinct compositions of carbon and nitrogen occur in first and second sublayers with the first sublayer being nearer the magnetic materials and having from 10 to 25 atomic percent nitrogen.

20. The disk drive of claim 19 wherein the first sublayer is 1 to 8 nanometers thick; and the second sublayer has from 0 to 8 atomic percent nitrogen and is from 0.5 to 8 nanometers thick.

* * * * *